D. R. OSTRANDER.
Farm-Fence.
No. 162,850.
Patented May 4, 1875.
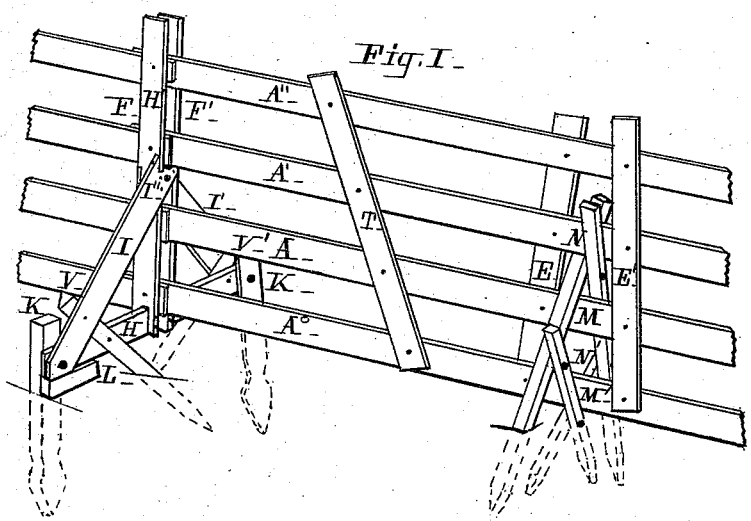
Fig. I.

UNITED STATES PATENT OFFICE.

DAVID R. OSTRANDER, OF FOUNTAIN GREEN, ILLINOIS.

IMPROVEMENT IN FARM-FENCES.

Specification forming part of Letters Patent No. 162,850, dated May 4, 1875; application filed December 23, 1874.

*To all whom it may concern:*

Be it known that I, DAVID R. OSTRANDER, of Fountain Green, Hancock county, Illinois, have invented Portable Fences, &c., of which the following is a specification:

This invention is an improvement in portable fences; and consists of separate panels, with devices for holding the ends and centers of the panels securely to the ground, and supporting the same as a fence. One of these is formed of two uprights—base and brace pieces—arranged to be held together by a bolt—lengthwise of panel—into a post, and the other formed of four stakes, driven crosswise through the center of the panels into the ground, and bolted together solidly into a frame, the whole arranged substantially as hereinafter set forth, referring to the accompanying drawing, in which—

Figure 1 shows a portion of a panel of the fence as in use.

The fence is composed of separate panels, formed of horizontal boards A A'. These are connected together by cross-pieces E E', near the center, with a short space between them. The ends of these panels interlap in line between the upright portions F F' of the portable posts which hold them together. The bottoms of these uprights are fixed onto a base, H, by setting them into notches, and nailing or other means, so as to solidly secure them together and in place. The upper portions are held together by a bolt, H', through them, and a block between. The portable post has braces I I', from the ends of base H on each side to the uprights F F'. These are notched and set into the uprights, one on each side, so that the uprights are between them; and a bolt, I'', is put through the ends of the braces, so as to bind them, together with the uprights, into a firm post. The ends of the base H are bolted between the ends of the braces I I', and short posts or stakes K K' set into the ground. These stakes K K' are notched on their sides, near their upper ends, to receive the sides of base H, and form shoulders above and below it, to hold it in place and bear the weight when bolted fast. These stakes are notched on their sides underground, to hold them solid when well set. They are sharpened at their lower ends, to be driven into the ground. They are driven so as to hold the base a little off the ground; and blocks L are placed under the ends of the base, to help hold it up.

The stakes may be driven either nearly vertical, and may be inclined either toward or from the fence, so as to secure a hold on the ground to prevent drawing up in overturning the fence. For moving, the bolts in the tops of the stakes may be removed, and those in the tops of the uprights loosened, and the parts taken apart.

The stakes M N are driven between the boards in the center of the panels, between the cross parts E E', to fill the space between them. They are driven one from each side into the ground on the sides as braces, to hold the center of the panel firm. They have stakes driven under the fence M' N', crossing under the lower board; and stakes M M' N N' are bolted together at each of the crossings, so as to form a frame and a firm hold on the ground, into which they are driven at opposite angles. Stakes V V' are driven into the ground in the angles between the base H and the braces I I' sidewise, so as to lock the portable posts firmly in place. The upper boards A'' are notched on the under side of their ends, to rest on blocks between the uprights held by bolt H', and have a pin through them and the uprights above this. Each board may also have such a pin to hold it, made so as to be readily removed, and inclined a little down from the larger end, so as to stay in. The panels have cross-parts T toward each end, fastened to each board by wrought-nails, riveted or clinched so as to pivot on them, to let the boards be drawn apart or together by changing the inclination of the parts Y lengthwise of panels, to make a low tight fence for small animals, or a high one for large stock, or any intermediate degree, without making new panels. For this purpose these cross-parts have a different inclination lengthwise of panel from that of the posts, so as to form braces with them. The posts are arranged to be inclined one way for a low fence, to stand vertical for an intermediate one, and to incline the other way for a high one; while the cross-parts only change from a greater inclination lengthwise of panel to a vertical.

The stakes V V' assist in securing the posts when inclined. The parts E E' are attached by nails partly driven in, so they may be readily drawn for changing.

I claim—

1. The portable fence-posts having the base H, the uprights F F', braces I I', fitted to two sides of the uprights and the bolt I'' lengthwise of panel, holding all firmly together in one post, substantially as and for the purpose set forth.

2. In combination with the panels A, the auxiliary support formed of the four stakes M M' N N' driven into the ground crosswise securely, and all four bolted together into one frame to support and hold the panels, substantially as set forth.

D. R. OSTRANDER.

Witnesses:
   JACOB GEORGE,
   JOHN B. McFADDEN.